US007779718B2

(12) United States Patent
Jordan et al.

(10) Patent No.: US 7,779,718 B2
(45) Date of Patent: Aug. 24, 2010

(54) BICYCLE SHIFTER

(75) Inventors: Brian Jordan, Chicago, IL (US); Christopher Shipman, Chicago, IL (US); Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 1113 days.

(21) Appl. No.: 10/906,730

(22) Filed: Mar. 3, 2005

(65) Prior Publication Data

US 2006/0207375 A1 Sep. 21, 2006

(51) Int. Cl.
*F16C 1/10* (2006.01)
*G05G 11/00* (2006.01)
*G05G 13/00* (2006.01)

(52) U.S. Cl. ........................................ 74/502.2; 74/489
(58) Field of Classification Search ................... 74/489, 74/502, 473.14, 558, 502.2, 501.6; B62K 23/06
See application file for complete search history.

(56) References Cited

U.S. PATENT DOCUMENTS

| | | | |
|---|---|---|---|
| 3,972,247 A | | 8/1976 | Armstrong |
| 5,012,692 A | * | 5/1991 | Nagano ................... 74/473.14 |
| 5,241,878 A | | 9/1993 | Nagano |
| 5,479,776 A | | 1/1996 | Romano |
| 5,682,794 A | * | 11/1997 | Shibata ........................ 74/489 |
| 5,862,709 A | * | 1/1999 | Kageyama ................... 74/489 |
| 7,152,497 B2 | * | 12/2006 | Sato et al. ................... 74/502.2 |
| 2002/0104401 A1 | | 8/2002 | Dal Pra |
| 2002/0124679 A1 | | 9/2002 | Dal Pra |
| 2003/0167876 A1 | * | 9/2003 | Wessel ........................ 74/578 |
| 2006/0096404 A1 | * | 5/2006 | Wessel et al. .............. 74/501.6 |
| 2007/0068318 A1 | * | 3/2007 | Jordan et al. ............... 74/502.2 |
| 2008/0115615 A1 | * | 5/2008 | Lim et al. .................. 74/502.2 |
| 2010/0083788 A1 | * | 4/2010 | Jordan et al. ............... 74/502.2 |

FOREIGN PATENT DOCUMENTS

DE 31 36 922 A1 3/1983

(Continued)

OTHER PUBLICATIONS

Machine Translation of FR 2 701 917, STIC of PTO, Dec. 29, 2009.*

*Primary Examiner*—Vinh T. Luong
(74) *Attorney, Agent, or Firm*—Milan Milosevic; Lisa Serdynski

(57) ABSTRACT

A bicycle shifter for pulling and releasing a control cable connected to a gear change mechanism that includes a housing mountable to a handlebar, a takeup member, a control member, a holding mechanism and a release mechanism. The takeup member is movable for pulling the control cable in a cable-pull direction and releasing the control cable in a cable-release direction. The control member is movable in a shift direction from a rest position for a first shift movement to permit motion of the takeup member in the cable-release direction. The first shift movement corresponds to a single gear change. The control member is movable in the shift direction from the rest position for a second shift movement to move the takeup member in the cable-pull direction. The second shift movement corresponds to a plurality of gear changes. The second shift movement is greater than the first shift movement. The control member is biased toward the rest position. The holding mechanism retains the takeup element in a selected gear position. The drive mechanism is operable for releasing the holding mechanism from the takeup member and for moving the takeup member in response to actuation of the control member.

42 Claims, 4 Drawing Sheets

FOREIGN PATENT DOCUMENTS

| | | | |
|---|---|---|---|
| EP | 0 507 240 A1 * | 10/1992 |
| EP | 0 601 211 A1 | 6/1994 |
| EP | 1 400 878 A2 | 7/2004 |
| EP | 1 502 847 A1 | 2/2005 |
| FR | 2 701 917 * | 9/1994 |

\* cited by examiner

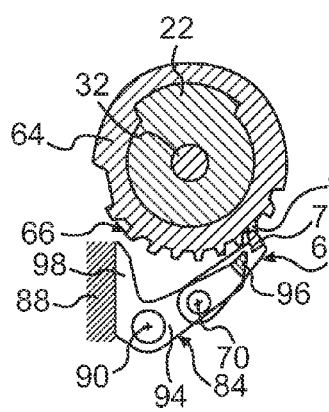
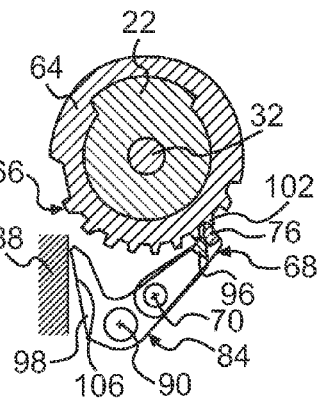
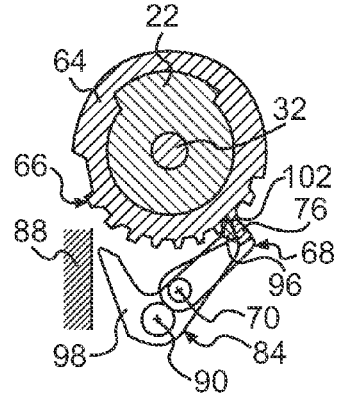
FIG. 4a    FIG. 4b    FIG. 4c
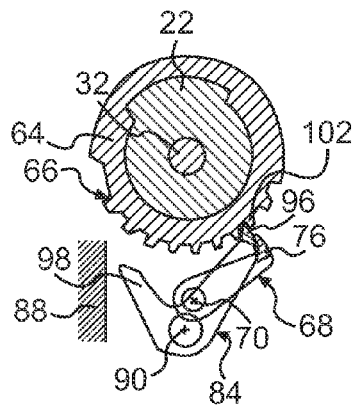
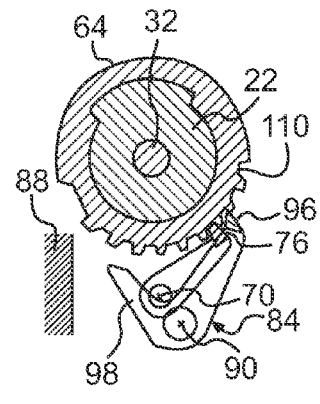
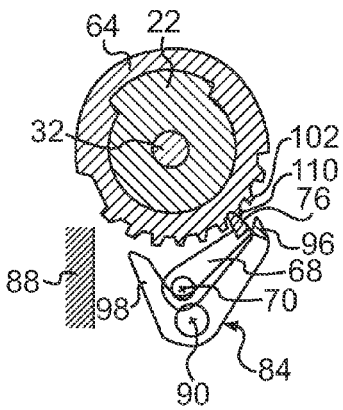
FIG. 4d    FIG. 4e    FIG. 4f
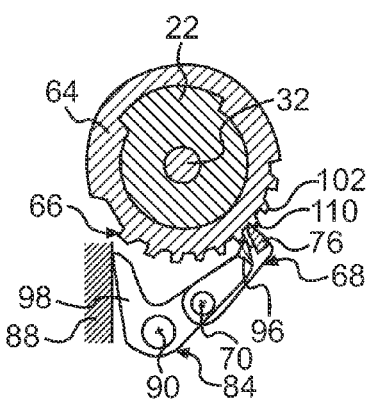
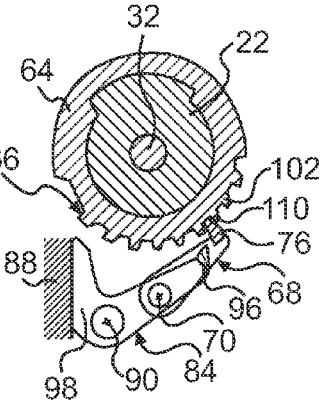
FIG. 4g    FIG. 4h

BICYCLE SHIFTER

BACKGROUND OF THE INVENTION

The present invention relates to bicycle shifters, and more particularly, to a bicycle shifter having a single control lever movable in one direction for pulling and releasing a control cable.

Conventional bicycle shifters have been designed to include separate control levers, one for pulling, another for releasing the control cable. Disadvantages of a two-lever shifter include added weight and the discomfort of repeatedly maneuvering the hand and fingers between the two levers. Bicycle shifters have also been designed to include a single lever operable in two directions, one to pull, the other to release the control cable. Although acceptable for some applications, discomfort and loss of control may result when shifting, as the rider maneuvers his hand and fingers to alternate sides of such a lever.

SUMMARY OF THE INVENTION

The present invention provides a bicycle shifter having a single control member movable in a shift direction to both pull and release a control cable connected to a gear change mechanism. The bicycle shifter includes a housing mountable to a handlebar of the bicycle, the housing enclosing a takeup member movable to pull and release the control cable in cable-pull and cable-release directions. Typically, the takeup member is biased in the cable-release direction by tension in the control cable, but may also be biased by a takeup member return spring, or the like. A shifter holding mechanism retains the takeup member in a selected gear position, while a drive mechanism is operable to disengage the holding member in response to actuation of the control member, allowing the takeup member to move. To shift gears, the rider moves the control member in the same shift direction for a first shift movement to move the takeup member in the cable-release direction, or for a second shift movement, to move the takeup member in the cable-pull direction. Each first shift movement corresponds to a single gear change while the second shift movement corresponds to one or more gear changes. Further, the second shift movement of the control member is greater than the first shift movement. The control member is biased toward a rest position.

In one embodiment of the present invention, the takeup member is rotatable about an axis to wind and unwind the control cable thereon in the cable-pull and cable-release directions. The control member is preferably a control lever rotatably mounted to a shaft located in the housing. Preferably, the takeup member and control lever rotate about the same shaft attached to the housing. The shifter further includes a ratchet wheel having preferably a plurality of unevenly spaced teeth about its periphery, the ratchet wheel being rotatable with the takeup member, while the holding mechanism includes a holding pawl engageable with the ratchet wheel teeth to retain the takeup member in a selected gear position. The holding pawl has a body and a nose extending, from the body, the nose biased to engage the teeth of the ratchet wheel.

The drive mechanism includes a drive pawl rotatably mounted to the control lever, while the shifter further includes a declutching element for disengaging the drive pawl from the ratchet wheel. The drive pawl has a body, a nose extending from the body, and a tail. The nose of the drive pawl is biased by a spring to engage the ratchet wheel teeth, and is engageable with the nose of the holding pawl to release the holding pawl from the ratchet wheel teeth. The tail of the drive pawl is engageable with the declutching element, preferably a declutching wall of the housing, to rotate the drive pawl and disengage the nose of the drive pawl from the ratchet wheel teeth.

Before actuation, the control lever is in a rest position, the tail of the drive pawl rests against the declutching wall, and the nose of the drive pawl is disengaged from the ratchet wheel teeth. Further, the nose of the holding pawl is engaged with a corresponding first tooth of the ratchet wheel to retain the takeup member in a selected gear position.

To perform a cable-release operation, the control lever is actuated in the shift direction, rotating the control lever about its shaft, and causing the drive pawl to pivot about its own axis to move the nose of the drive pawl toward the ratchet wheel teeth. As the control lever is further rotated, the drive pawl nose engages the holding pawl nose to release it from engagement with the first tooth on the ratchet wheel. In alternative embodiments, intermediate elements may transmit motion between the drive pawl and holding pawl. Once disengaged, the takeup member and ratchet wheel are free to rotate in the cable-release direction until the driving pawl nose engages the same first tooth of the ratchet wheel. The engagement of the driving pawl nose with the just-released first tooth of the ratchet wheel, provides both audible and tactile feedback to the rider, signaling when to stop moving the control lever in the shift direction and releasing the lever to effect a cable-release operation. As the control lever is released, now rotating toward its rest position, the tail of the drive pawl bears against the declutching wall, rotating the drive pawl to disengage the drive pawl nose from the ratchet wheel teeth. When the drive pawl nose disengages from the first tooth of the ratchet wheel, the takeup member and ratchet wheel rotate in the cable-release direction, under the tensile force of the control cable, until the nose of the holding pawl engages the adjoining second tooth, resulting in a gear shift by one gear increment in the cable-release direction. At the end of the cable-release operation, the drive pawl returns to its rest position against the declutching wall, to position the control lever in its rest position.

To perform a cable-pull operation, instead of releasing the control lever upon disengagement of the holding pawl from the ratchet wheel during a cable-release operation, the lever is further rotated in the shift direction. Further rotation of the control lever causing the drive pawl to drive the takeup member and the ratchet wheel in the cable-pull direction, while the holding pawl free-clutches, the holding pawl nose freely sliding along the teeth of the ratchet wheel. The rider may rotate the control lever in the shift direction until the holding pawl nose engages a ratchet wheel tooth corresponding to a single, or multiple, gear shift increments in the cable-pull direction. Once a desired gear position is reached, the control lever is released and it rotates toward its rest position, now causing the drive pawl nose to free-clutch over the ratchet wheel teeth, while the holding pawl retains the takeup member in the selected gear position.

These and other features and advantages of the present invention will be more fully understood from the following description of one or more embodiments of the invention, together with the accompanying drawings.

BRIEF DESCRIPTION OF THE DRAWINGS

In the drawings:

FIGS. 4a-4h are cross-sectional views of the holding mechanism and the drive mechanism at different stages of a cable-pull operation.

DETAILED DESCRIPTION

Figure 1:
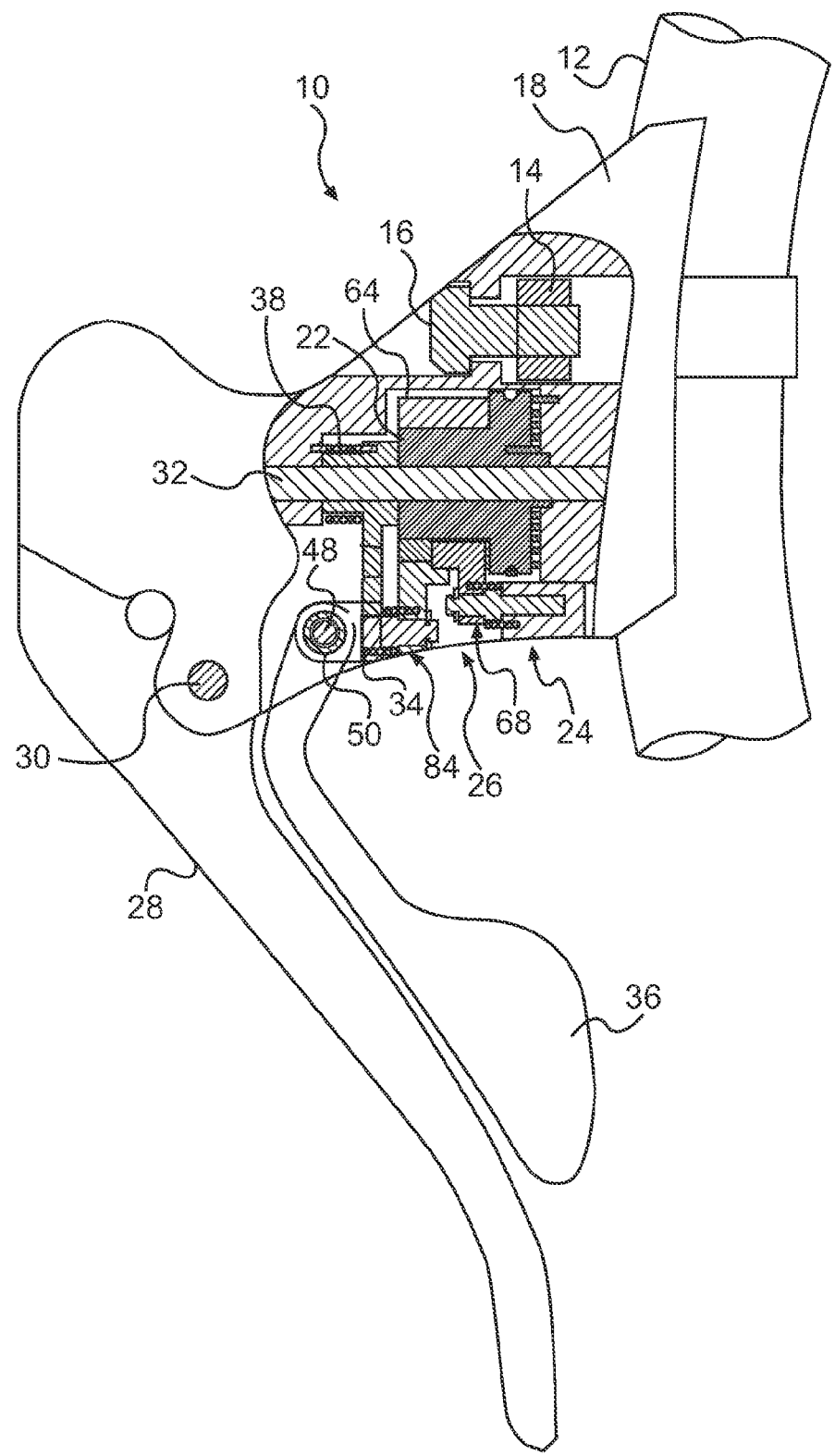
FIG. 1 is a partial cross-sectional view of a bicycle shifter according to one embodiment of the present invention.
Figure 2:
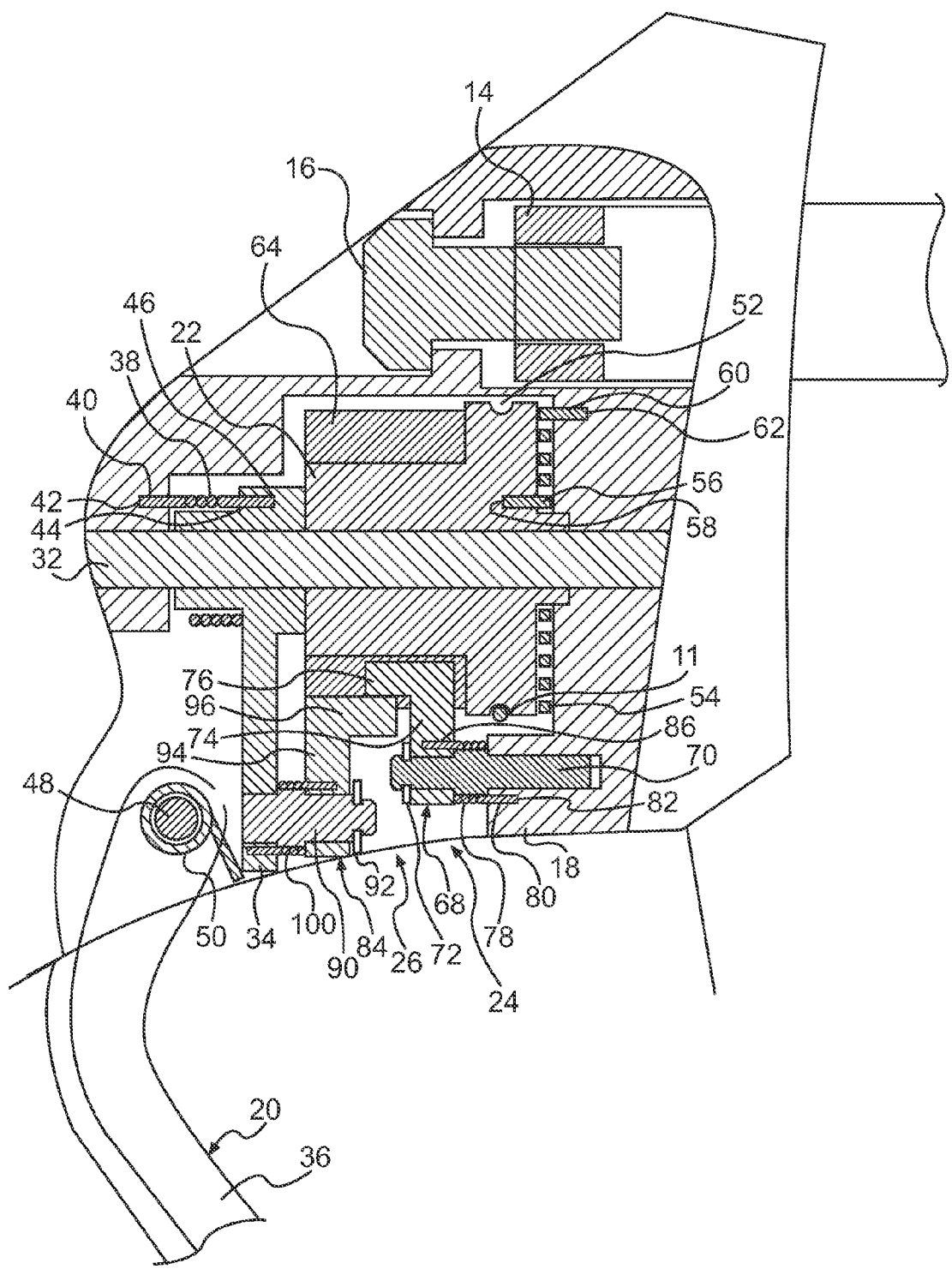
FIG. 2 is an enlarged partial cross-sectional view of the bicycle shifter of FIG. 1.

FIGS. 1-4 illustrate a bicycle shifter 10 according to one embodiment of the present invention. The bicycle shifter 10 pulls or releases a control cable 11 connected to a gear change mechanism (not shown) to shift between various gear positions. The gear change mechanism may be a derailleur, or other external or internal gear change devices. The bicycle shifter 10 is mounted to a handlebar 12 by a clamp 14 and a bolt 16. The bicycle shifter 10 shown is a road shifter for use on a road bike. However, similar shifters may be adapted for use on other types of bicycles, including mountain bikes. In this embodiment, the bicycle shifter 10 generally includes a housing 18, a control member 20, a takeup member 22, a holding mechanism 24 and a drive mechanism 26. In this embodiment, the shifter 10 is integrated with a brake lever 28. The brake lever 28 pivots about a brake pivot 30, pulling a brake cable (not shown) to slow the bicycle. Alternatively, the brake lever 28 may be formed separately from the shifter 10.

In this embodiment, the housing 18 is mounted to the handlebar 12 and a mounting shaft 32 extends through the housing 18. The control member 20, in this embodiment a control lever 20, includes a first portion 34 and a second portion 36, the first portion 34 rotatably mounted to the shaft 32. The control lever 20 is biased toward a rest position by a preloaded control lever return spring 38. A first leg 40 of the control lever return spring 38 is received in an opening 42 in the housing 18, and a second leg 44 of the control lever return spring 38 is received in an opening 46 in the control lever 20. The second portion 36 of control lever 20, in addition to rotating about shaft 32 along with first portion 34, also rotates about a perpendicular lever shaft 48 mounted to the first portion 34 of the control lever 20. The second portion 36 of the control lever 20 is biased by a preloaded return spring 50 mounted coaxially with the lever shaft 48. A first leg of the return spring 50 is received in an opening in the second portion 36 of the control lever 20, and a second leg of the return spring 50 is supported by the first portion 34 of the control lever 20. In this embodiment, the control lever 20 includes two portions 34, 36 to allow the second portion 36 of the control lever 20 to move with the brake lever 28 when the brake lever 28 is actuated. In other embodiments, the control lever 20 may be formed as one piece.

The takeup member 22, in this embodiment a spool, is rotatably mounted on the shaft 32. The takeup member 22 includes a groove 52 along its periphery, for receiving the control cable 11. The takeup member 22 is biased in the cable-release direction by tension in the control cable 11 and, preferably, by a takeup member return spring 54. The takeup member return spring 54 is disposed between the takeup member 22 and the housing 18. The return spring 54 includes a first leg 56 received in an opening 58 in the takeup member 22, and a second leg 60 received in an opening 62 in the housing 18.

The shifter 10 includes a ratchet wheel 64 having preferably a plurality of unevenly spaced teeth 66 about its periphery, while the holding mechanism 24 includes a holding pawl 68 engageable with the teeth 66 to prevent unwinding of the takeup member 22. The ratchet wheel 64 is rotatably mounted to the shaft 32 and rotates with the takeup member 22. The ratchet wheel teeth 66 correspond to gear positions of the gear change mechanism. Alternatively, the ratchet wheel 64 and the takeup member 22 may be formed as one piece. The holding pawl 68 is rotatable about a holding pawl pivot 70 fixed to the housing 18, and is axially positioned by a retaining ring 72. The holding pawl 68 is rotatable about a holding pawl pivot 70 fixed to the housing 18, and is axially positioned by a retaining ring 72. The holding pawl 68 includes a body 74, and a nose 76 extending from the body 74. The holding pawl nose 76 is biased to engage the ratchet wheel teeth 66 by a preloaded holding pawl spring 78, coaxially mounted to the holding pawl pivot 70. A first leg 80 of the holding pawl spring 78 is received in an opening 82 in the housing 18, and a second leg 84 is supported by the holding pawl 68.

The drive mechanism 26 includes a drive pawl 84 rotatably mounted about a drive pawl pivot 90 fixed to the control lever 20. The drive pawl 84 is axially positioned by a retaining ring 92. The drive pawl 84 includes a body 94, a nose 96 extending from the body 94, and a tail 98. A drive pawl spring 100 biases the drive pawl nose 96 toward the ratchet wheel teeth 66. The tail 98 of the drive pawl 84 rests against a declutching element 88, in this embodiment, a declutching wall 88 of the housing 18, when the control lever 20 is in its rest position.

Figure 3A:
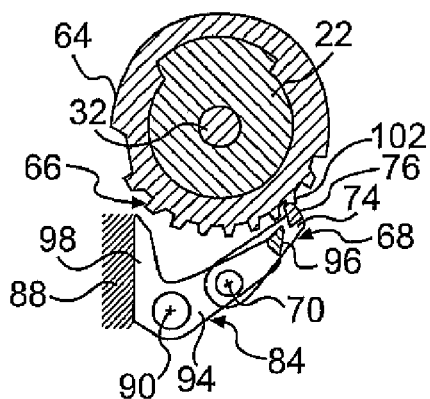
FIGS. 3a-3f are cross-sectional views of a holding mechanism and a drive mechanism at different stages of a cable-release operation.

To shift the gear change mechanism, the control lever 20 is rotated in the shift direction for a first shift movement to release the control cable 11, and in the same direction for a second shift movement to pull the control cable 11, the second shift movement being greater than the first shift movement. Looking to FIGS. 3a-3f, a cable-release operation is described. Before the control lever 20 is actuated, the tail 98 of the drive pawl 84 rests against the declutching wall 88, positioning the control lever 20 in its rest position (FIG. 3a). Further, the takeup member 22 and the ratchet wheel 64 are retained in a selected gear position by the holding pawl 68, shown engaging a corresponding first tooth 102.

Figure 3B:
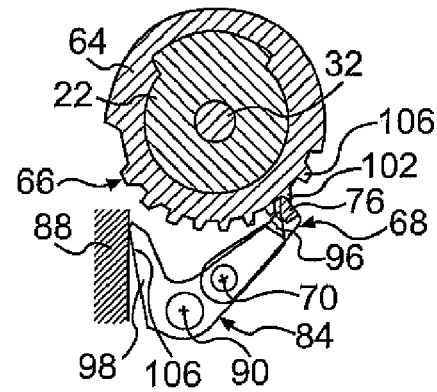
Figure 3C:
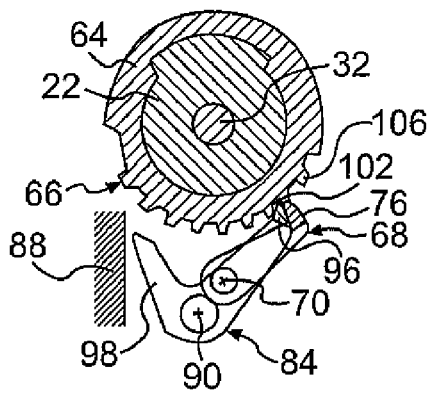

Looking to FIG. 3b, as the control lever 20 is actuated by the rider, the lever 20 rotates about the shaft 32, moving the drive pawl 84 away from the declutching wall 88, and pivoting the drive pawl nose 96 toward the ratchet wheel teeth 66. Looking to FIG. 3c, as the lever 20 is further rotated, the drive pawl nose 96 engages the holding pawl nose 76, causing the holding pawl 68 to release the first tooth 102 of the ratchet wheel 64. Once released, the ratchet wheel 64 rotates about the shaft 32 in the cable-release direction, until the first tooth 102 engages the drive pawl nose 96. This action provides both audible and tactile feedback to the rider, signaling the rider to release the control lever 20, if a cable-release operation is desired.

Figure 3D:
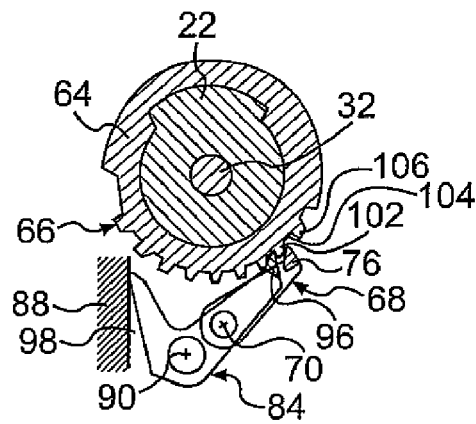
Figure 3E:
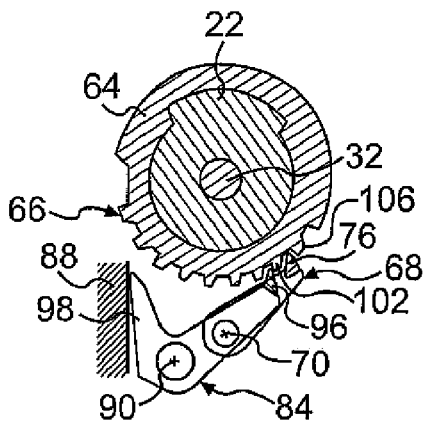
Figure 3F:
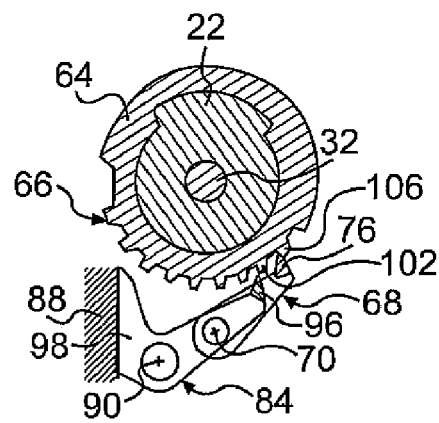

Looking to FIG. 3d, as the control lever 20 is released, allowing it to pivot towards its rest position, the ratchet wheel 64 rotates in the cable-release direction. Further, the holding pawl nose 76 moves toward engagement with a recess 104 associated with an adjoining second tooth 106 of the ratchet wheel 64, and the drive pawl tail 98 moves toward engagement with the declutching wall 88. As the control lever 20 rotates further toward its rest position, the drive pawl nose 96 pivots further away from the ratchet wheel teeth 66, due to the torque created as the drive pawl tail 98 bears against the declutching wall 88 (FIG. 3e). When the drive pawl 84 disengages from the ratchet wheel teeth 66, the ratchet wheel 64 rotates in the cable-release direction under the force of the control cable 11 and the takeup member return spring 54, until the holding pawl nose 76 engages the second adjoining ratchet wheel tooth 106, resulting in a gear shift, by one gear increment, in the cable-release direction. At the end of the cable-release operation, the drive pawl 84 moves back to its rest position against the declutching wall 88 (FIG. 3*f*), positioning the control lever 20 in its rest position.

Looking to FIGS. 4*a*-4*h*, a cable-pull operation is described. Before the control lever 20 is actuated, the drive pawl tail 98 rests against the declutching wall 88, positioning the control lever 20 is in its rest position (FIG. 4*a*). So positioned, the ratchet wheel 64 is retained in a selected gear position with the holding pawl 68 engaging the first ratchet wheel tooth 102. As the control lever 20 is actuated by the rider in the shift direction, the drive pawl 84 moves away from the declutching wall 88, positioning the drive pawl nose 96 toward the ratchet wheel teeth 66 (FIG. 4*b*).

Looking to FIG. 4*c*, as the control lever 20 is further rotated, the drive pawl nose 96 engages the holding pawl nose 76, driving the holding pawl nose 76 out of engagement with the first ratchet wheel tooth 102. Once released, the ratchet wheel 64 rotates in the cable-release direction until the first tooth 102 engages the drive pawl nose 96. As the control lever 20 is further rotated in the shift direction, the drive pawl 84 drives the ratchet wheel 64 in cable-pull direction, as the holding pawl 68 free-clutches, the holding pawl nose 76 freely sliding along the ratchet wheel teeth 66 (FIG. 4*d*).

Looking to FIG. 4*e*, as the control lever 20 is further rotated, the drive pawl 84 further rotates the ratchet wheel 64 in the cable-pull direction until the holding pawl 68 engages a next third tooth 110 on the ratchet wheel 64, resulting in a single gear shift in the cable-pull direction. The rider, of course, is not limited to single gear shift increments in the cable-pull direction. The rider may readily shift multiple gear increments in the cable-pull direction by simply continuing to move the control lever in the shift direction, until the desired gear position is reached. Audible and tactile feedback is provided to the rider as each gear shift increment is passed.

Looking to FIG. 4*f*, after the desired gear position is reached, the rider releases the control lever 20 causing the control lever 20 and the drive pawl 84 to rotate toward their rest positions under the force of the control lever return spring 38. As the control lever 20 further rotates toward its rest position, the drive pawl tail 98 bears against the declutching wall 88, creating a torque that rotates the drive pawl 84 away from the ratchet wheel teeth 66 (FIG. 4*g*). Looking to FIG. 4*h*, the drive pawl 84 is in its rest position against the declutching wall 88, with the drive pawl nose 96 disengaged from the ratchet wheel 64.

While this invention has been described with respect to one or more preferred embodiments, it should be understood that numerous changes could be made without departing from the spirit and scope of the inventive concepts described. Accordingly, it is intended that the invention not be limited to the disclosed embodiments, but that it be afforded the full scope permitted by the language of the following claims.

What is claimed is:

1. A bicycle shifter for pulling and releasing a control cable connected to a gear change mechanism, the bicycle shifter comprising:
    a housing configured to be mounted to a handlebar;
    a takeup member supported by the housing and connected to an end of the control cable,
    the takeup member displaced to pull the control cable in a cable-pull direction and release the control cable in a cable-release direction, the takeup member biased in the cable-release direction;
    a single control member operatively connected to the takeup member,
    the single control member displaced in a shift direction from a rest position for a first shift movement to move the takeup member in the cable-release direction, the first shift movement corresponding to a single gear change,
    the single control member displaced in the shift direction from the rest position for a second shift movement to move the takeup member in the cable-pull direction, the second shift movement corresponding to a plurality of gear changes, the second shift movement of the single control member being greater than the first shift movement, the single control member biased toward the rest position;
    a holding mechanism operatively connected to the takeup member to retain the takeup member in a selected gear position; and
    a drive mechanism operatively connected to the single control member and configured to release the holding mechanism from the takeup member and move the takeup member in response to actuation of the single control member.

2. The bicycle shifter of claim 1, wherein the takeup member is rotated about an axis for winding and unwinding the control cable thereon.

3. The bicycle shifter of claim 2, further comprising a ratchet wheel configured to rotate with the takeup member and having a plurality of teeth, the holding mechanism including a holding pawl biased to engage the ratchet wheel teeth to retain the takeup member in a selected gear position.

4. The bicycle shifter of claim 3, wherein the holding pawl is rotatably mounted to the housing.

5. The bicycle shifter of claim 3, wherein the holding pawl is biased to engage the ratchet wheel by a spring.

6. The bicycle shifter of claim 3, wherein the drive mechanism includes a drive pawl rotatably mounted to the single control member and biased to engage the ratchet wheel teeth, the drive pawl configured to release the holding pawl from the ratchet wheel and rotate the takeup member in response to actuation of the single control member.

7. The bicycle shifter of claim 6, further comprising a declutching element for disengaging the drive pawl from the ratchet wheel.

8. The bicycle shifter of claim 7, wherein the declutching element is a declutching wall of the housing.

9. The bicycle shifter of claim 6, wherein the drive pawl is biased by a spring.

10. The bicycle shifter of claim 7, wherein the drive pawl includes a body pivotably attached to the single control member, a nose configured to engage the ratchet wheel teeth, and a tail configured to engage the declutching element; and the holding pawl includes a body pivotably attached to the housing and a nose configured to engage the ratchet wheel teeth.

11. The bicycle shifter of claim 10, wherein after the first shift movement, the tail of the drive pawl abuts against the declutching element to disengage the nose of the drive pawl from the ratchet wheel teeth.

12. The bicycle shifter of claim 11, wherein the tail of the drive pawl abuts against the declutching element during motion of the single control member toward its rest position.

13. The bicycle shifter of claim 10, wherein the drive pawl is configured such that the drive pawl nose disengages the holding pawl nose from the ratchet wheel teeth to rotate the takeup member in response to actuation of the single control member.

14. The bicycle shifter of claim 2, wherein the single control member is a single control lever biased toward the rest position by a return spring.

15. A bicycle shifter for pulling and releasing a control cable connected to a gear change mechanism, the bicycle shifter comprising:
   a housing configured to be mounted to handlebar;
   a takeup member supported by the housing and connected to an end of the control cable,
   the takeup member displaced to pull the control cable in a cable-pull direction and release the control cable in a cable-release direction, the takeup member biased in the cable-release direction;
   a ratchet wheel configured to rotate the takeup member and having a plurality of unevenly spaced teeth;
   a single control member operatively connected to the takeup member,
   the single control member displaced in a shift direction from a rest position for a first shift movement to move of the takeup member in the cable-release direction, the first shift movement corresponding to a single gear change,
   the single control member displaced in the shift direction from the rest position for a second shift movement to move the takeup member in the cable-pull direction, the second shift movement corresponding to at least one gear change, the second shift movement of the single control member being greater than the first shift movement, the single control member biased toward the rest position;
   a holding mechanism operatively connected to the takeup member to retain the takeup member in a selected gear position; and
   a drive mechanism operatively connected to the single control member and configured to engage and release the holding mechanism from the takeup member, and move the takeup member in response to actuation of the single control member.

16. The bicycle shifter of claim 15, wherein the takeup member is rotated about an axis for winding and unwinding the control cable thereon.

17. The bicycle shifter of claim 16, wherein the holding mechanism includes a holding pawl biased to engage the ratchet wheel teeth to retain the takeup member in a selected gear position.

18. The bicycle shifter of claim 17, wherein the holding pawl is rotatably mounted to the housing.

19. The bicycle shifter of claim 17, wherein the holding pawl is biased to engage the ratchet wheel teeth by a spring.

20. The bicycle shifter of claim 17, wherein the drive mechanism includes a drive pawl rotatably mounted to the single control member and biased to engage the ratchet wheel teeth.

21. The bicycle shifter of claim 20, further comprising a declutching element for disengaging the drive pawl from the ratchet wheel.

22. The bicycle shifter of claim 21, wherein the declutching element is a declutching wall of the housing.

23. The bicycle shifter of claim 20, wherein the drive pawl is biased by a spring.

24. The bicycle shifter of claim 21, wherein the drive pawl includes a body pivotably attached to the single control member, a nose configured to engage the ratchet wheel teeth, and a tail configured to engage the declutching element; and the holding pawl includes a body pivotably attached to the housing and a nose configured to engage the ratchet wheel teeth.

25. The bicycle shifter of claim 24, wherein after the first shift movement, the tail of the drive pawl abuts against the declutching element to disengage the nose of the drive pawl from the ratchet wheel teeth.

26. The bicycle shifter of claim 25, wherein the tail of the drive pawl abuts against the declutching element during motion of the single control member toward its rest position.

27. The bicycle shifter of claim 24, wherein the drive pawl is configured such that the drive pawl nose engages and releases the holding pawl nose from the ratchet wheel teeth to rotate the takeup member in response to actuation of the single control member.

28. The bicycle shifter of claim 16, wherein the single control member is a single control lever biased toward the rest position by a return spring.

29. A bicycle shifter for pulling and releasing a control cable connected to a gear change mechanism, the bicycle shifter comprising:
   a housing configured to be mounted to handlebar;
   a takeup member supported by the housing and connected to an end of the control cable,
   the takeup member displaced to pull the control cable in a cable-pull direction and release the control cable in a cable-release direction, the takeup member biased in the cable-release direction;
   a ratchet wheel configured to rotate with the takeup member and having a plurality of teeth;
   a single control member operatively connected to the takeup member,
   the single control member displaced in a shift direction from a rest position for a first shift movement to move of the takeup member in the cable-release direction, the first shift movement corresponding to a single gear change,
   the single control member displaced in the shift direction from the rest position for a second shift movement to move the takeup member in the cable-pull direction, the second shift movement corresponding to at least one gear change, the second shift movement of the control member being greater than the first shift movement, the single control member biased toward the rest position;
   a holding mechanism including a holding pawl biased to engage the teeth of the ratchet wheel to retain the takeup member in a selected gear position; and
   a drive mechanism including a drive pawl, the drive pawl configured to engage and release the holding pawl from the teeth of the ratchet wheel, the drive pawl configured to move the takeup member in response to actuation of the single control member.

30. The bicycle shifter of claim 29, wherein the takeup member is rotated about an axis for winding and unwinding the control cable thereon.

31. The bicycle shifter of claim 29, wherein the holding pawl is biased to engage a current tooth of the ratchet wheel to retain the takeup member in a selected gear position, the drive pawl configured to engage and release the holding pawl from the current tooth of the ratchet wheel, the drive pawl configured to engage the current tooth to move the takeup member in response to actuation of the single control member.

32. The bicycle shifter of claim 29, wherein the holding pawl is rotatably mounted to the housing.

33. The bicycle shifter of claim 29, wherein the holding pawl is biased to engage the ratchet wheel teeth by a spring.

34. The bicycle shifter of claim 29, wherein the drive pawl is rotatably mounted to the single control member and biased toward the ratchet wheel teeth.

35. The bicycle shifter of claim 34, further comprising a declutching element for disengaging the drive pawl from the ratchet wheel.

36. The bicycle shifter of claim 35, wherein the declutching element is a declutching wall of the housing.

37. The bicycle shifter of claim 34, wherein the drive pawl is biased by a spring.

38. The bicycle shifter of claim 35, wherein the drive pawl includes a body pivotably attached to the single control member, a nose configured to engage the ratchet wheel teeth, and a tail configured to engage the declutching element; and the holding pawl includes a body pivotably attached to the housing and a nose configured to engage the ratchet wheel teeth.

39. The bicycle shifter of claim 38, wherein after the first shift movement, the tail of the drive pawl abuts against the declutching element to disengage the nose of the drive pawl from the ratchet wheel teeth.

40. The bicycle shifter of claim 38, wherein the tail of the drive pawl abuts against the declutching element during motion of the single control member toward its rest position.

41. The bicycle shifter of claim 38, wherein the drive pawl is configured such that the drive pawl nose engages and releases the holding pawl nose from the ratchet wheel teeth to rotate the takeup member in response to actuation of the single control member.

42. The bicycle shifter of claim 30, wherein the single control member is a single control lever biased toward the rest position by a return spring.

\* \* \* \* \*